United States Patent [19]
Ikeda et al.

[11] Patent Number: 5,250,915
[45] Date of Patent: Oct. 5, 1993

[54] LAMINATE TYPE LC FILTER

[75] Inventors: Takeshi Ikeda, 2-5-6-213, Sanno, Ohta-ku, Tokyo; Akira Okamoto, Ageo, both of Japan

[73] Assignee: Takeshi Ikeda, Tokyo, Japan

[21] Appl. No.: 836,877

[22] Filed: Feb. 19, 1992

[30] Foreign Application Priority Data

Feb. 21, 1991 [JP] Japan .................................. 3-50600

[51] Int. Cl.$^5$ .......................... H03H 7/01; H01G 4/40
[52] U.S. Cl. .................................... 333/181; 333/185; 336/232; 336/200
[58] Field of Search ................ 333/140, 160, 177, 181, 333/184, 185, 12; 336/200, 232; 361/312, 321, 328

[56] References Cited

U.S. PATENT DOCUMENTS

| 2,943,966 | 7/1960 | Leno et al. | 336/200 |
|---|---|---|---|
| 4,048,593 | 9/1977 | Zillman | 333/185 X |
| 4,591,814 | 5/1986 | Ito et al. | 333/177 |
| 4,717,438 | 1/1988 | Benge et al. | 333/185 X |
| 4,904,967 | 2/1990 | Morii et al. | 333/184 X |
| 5,039,964 | 8/1991 | Ikeda | 333/181 |

FOREIGN PATENT DOCUMENTS

| 3143210A1 | 5/1983 | Fed. Rep. of Germany . |
|---|---|---|
| 55-156311 | 12/1980 | Japan . |
| 56-50507 | 5/1981 | Japan . |
| 56-142622 | 11/1981 | Japan . |
| 56-144524 | 11/1981 | Japan . |
| 63-7017 | 2/1988 | Japan . |
| 63-76313 | 4/1988 | Japan . |
| 1467387 | 3/1977 | United Kingdom . |
| 1470695 | 4/1977 | United Kingdom . |
| 1478354 | 6/1977 | United Kingdom . |

OTHER PUBLICATIONS

The International Journal for Hybrid Microelectronics, Vitriol et al., "Development of a Low Temperature Cofired Multi-Layer Ceramic Technology"; vol. 6, No. 11, Oct. 1983; Philadelphia, Pa.; pp. 593–598.

Primary Examiner—Robert J. Pascal
Assistant Examiner—Seung Ham
Attorney, Agent, or Firm—Oliff & Berridge

[57] ABSTRACT

A laminate type LC element includes a laminate defined by a plurality of stacked insulating layers. A first sheet-like conductor is formed between each pair of adjacent insulating layers to continuously wind and extend from between the pair of adjacent insulating layers to between another pair of adjacent insulating layers, the first conductor forming a coil having a preselected number of turns. A second sheet-like conductor is formed between each pair of adjacent insulating layers to continuously wind and extend from between the pair of adjacent insulating layers to between another adjacent pair of adjacent insulating layers, the second conductor being disposed in the face-to-face relationship relative to the first conductor through the insulating layers. The LC element has an increased capacitance and can reliably remove any external noise.

28 Claims, 20 Drawing Sheets

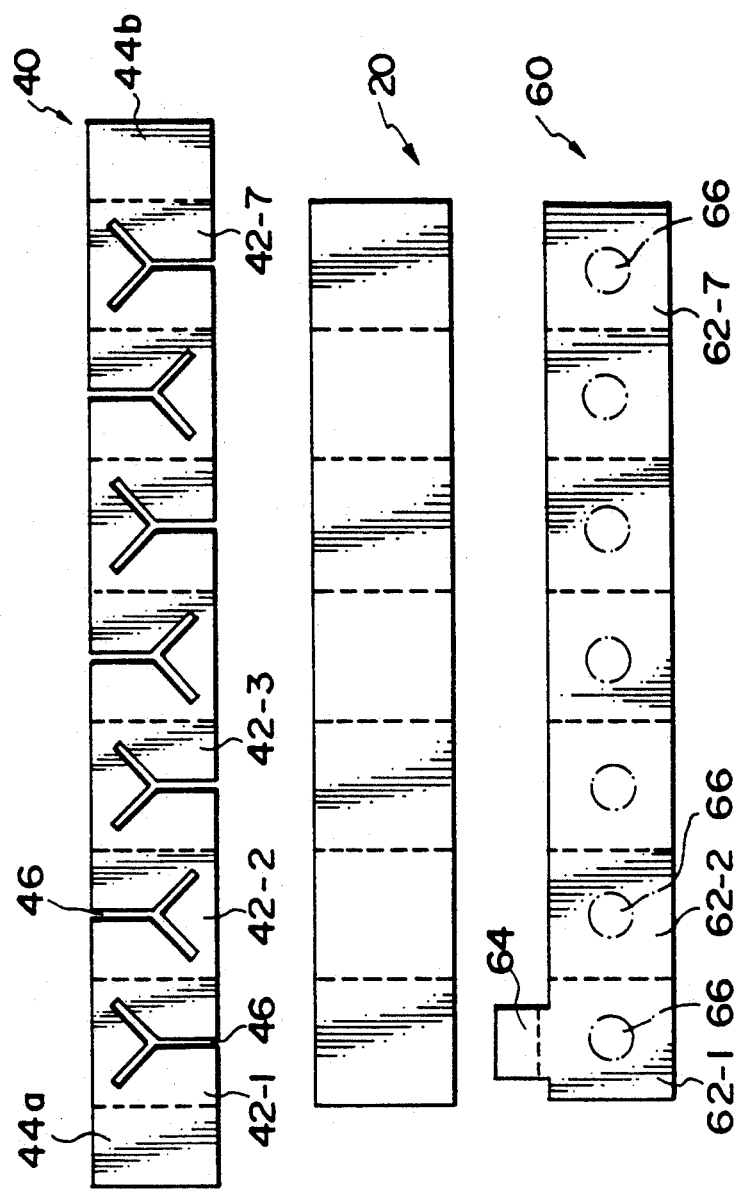

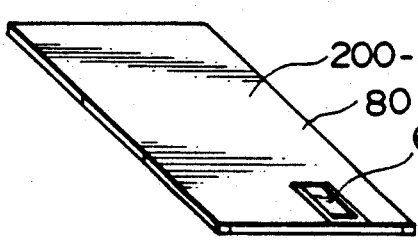

FIG. 22
PRIOR ART
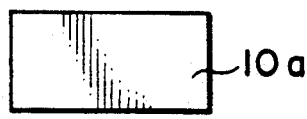
10a
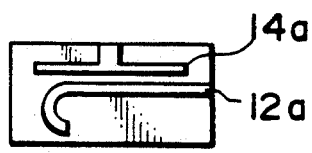
14a
12a
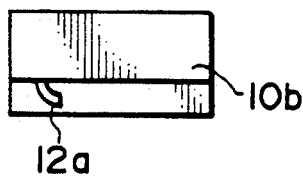
10b
12a
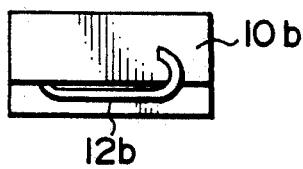
10b
12b
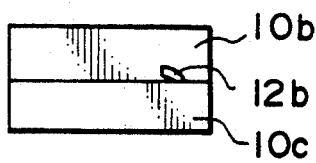
10b
12b
10c
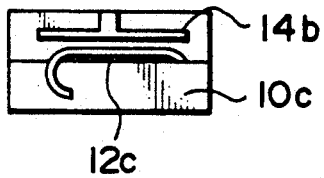
14b
10c
12c
FIG. 23
PRIOR ART
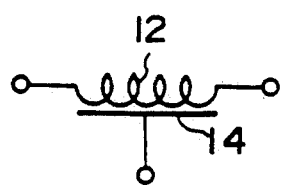
12
14

LAMINATE TYPE LC FILTER

BACKGROUND OF THE INVENTION

1. Field of the Invention

The present invention relates to a laminate type LC element and particularly to a laminate type LC element that comprises a laminated insulator and an LC circuit including inductors and capacitors, the LC circuit being formed in the laminated insulator to provide a distributed constant.

2. Description of the Related Art

With the development of the electronic techniques, many electronic circuits are currently utilized in various fields. It is thus desirable that these electronic circuits can operate stably and reliably without the effects of any external noises.

Various high-performance electronic instruments are increasingly subjected to severe limitations against noise. It is desired to provide a small-sized and high-performance noise filter capable of reliably eliminating noises.

FIG. 21 shows an LC noise filter constructed in accordance with the prior art, which comprises a core 1 and two windings 2 and 3. Each of the windings 2 and 3 is connected, at each end, parallel to the corresponding end of the other windings through a capacitor 4 or 5.

In such an arrangement, an inductor consisting of the core 1 and the windings 2, 3 is increased in size. And yet, such an inductor must be formed separately from the capacitors 4 and 5. This results in an increased in cost and size of the entire filter system.

Many proposals intending to overcome the above problems have been made, for example, in Japanese Patent Laid-Open Nos. Sho 56-50507, Sho 56-144524, Sho 56-142622 and Sho 63-76313.

FIG. 22 shows a composite electronic part constructed in accordance with Japanese Patent Laid-Open No. Sho 56-50507, in which a laminate is formed by stacking a plurality of insulator layers 10a, 10b, 10c. A conductive pattern 12a, 12b or 12c is located between the adjacent insulator layers to wind and extend continuously from one layer to another layer. In such a manner, there is formed a coil L having a predetermined number of turns.

A conductive layer 14a or 14b is also disposed between the adjacent insulating layers (10a and 10b; 10b and 10c) and spaced away from the corresponding conductive pattern 12a or 12c. A capacitance C is formed between each of the conductive layers 14a and 14b and the corresponding conductive pattern 12a or 12c.

In such a manner, there is provided a lumped-constant type noise filter including inductance L and capacitance C as shown in FIG. 23. Such a noise filter can be used as a small-sized and lightweight LC noise filter since inductance L and capacitance C are incorporated into the laminate.

This LC noise filter can have only a very small capacitance C between the coil and the conductive layers 14 since the conductive layers 14a and 14c forming the capacitance are located adjacent to the linear portions of the conductive patterns 12a and 12c forming the coil. Thus, the LC noise filter does not provide a good noise attenuation.

This lumped-constant type LC filter cannot reliably remove various noises and particularly common mode noises as on switching surge or normal mode noises as on a ripple.

In addition, this LC filter can be used only as a three-terminal type normal mode filter, rather than a four-terminal type common mode filter.

SUMMARY OF THE INVENTION

It is therefore an object of the present invention to provide a small-sized laminate type LC element which has a satisfactory capacitance and which can reliably eliminate any external noise.

Another object of the present invention is to provide a laminate type LC element which can be used not only as a normal mode type noise filter, but also as a common mode type noise filter, if required.

To this end, the present invention provides a laminate type LC element comprising:

a laminate including a plurality of stacked insulator layers;

a first conductor including a plurality of first sheet-like conductive elements each located between the adjacent insulator layers and electrically connected with the other conductive element from one insulator layer to the other insulator layer, each of said first sheet-like conductive elements being formed with a slit defining a continuous electric path which extends from one conductive element to the other conductive element, said first conductor being adapted to function as a coil having a preselected number of turns; and a second conductor including a plurality of second sheet-like conductive elements each located between the adjacent insulator layers and placed face to face with the corresponding one of said first conductive elements through the corresponding one of said insulator layers, a capacitance being formed between the first and second conductors.

As will be apparent from the foregoing, the present invention is characterized by that the first and second sheet-like conductive elements are placed face to face with each other through an insulator layer so as to form a sufficiently large capacitance therebetween.

In accordance with the present invention, thus, the first conductor not only functions as an inductor, but also defines a sufficiently large capacitance between the first and second conductors.

It is believed that the capacitance between the first and second conductors is of distributed constant. Therefore, the laminate type LC element of the present invention can function as a distributed constant type LC filter which provides a good attenuation through a relatively wide band, in comparison with the conventional lumped constant type LC filters. The LC element can eliminate various noises without any deteriorative matter such as ringing. Particularly, the laminate type LC element of the present invention can more effectively eliminate various noises since the L and C components of its distributed constant circuit function more effectively.

The laminate type LC element of the present invention can be used also as a normal mode type LC noise filter by providing a grounding terminal in the second conductor and by providing input/output terminals on the opposite ends of the first conductor.

Furthermore, the laminate type LC element of the present invention can be used as a common mode type LC noise filter by providing input/output terminals on the opposite ends of the first and second conductors.

In such a novel arrangement, a sufficiently large capacitance can be formed between the first and second conductors placed face to face through the insulator layer, thereby providing a small-sized and high-performance laminate type LC element which can be manufactured inexpensively.

Particularly, by placing the first and second sheet-like conductive elements in a face-to-face relationship through the insulating layer, the capacitance therebetween can be increased. It is also believed that the capacitance between the first and second conductors is of a distributed constant type. Therefore, the present invention can provide an LC noise filter which can reliably eliminate any external noise to proved an excellent attenuation, in comparison with the conventional lumped constant type noise filters.

The LC element of the present invention can be used as a common mode type noise filter by utilizing both the first and second conductors as energizing conductors and also as a normal mode type noise filter by grounding the second conductor.

BRIEF DESCRIPTION OF THE DRAWINGS

FIG. 2(A) showing the formation of a first bellows-like insulating sheet including first and second conductors; FIG. 2(B) showing the lamination of the insulating sheet shown in FIG. 2(A); FIG. 2(C) showing a connecting lead applied to the laminate; and FIG. 2(D) showing a final configuration of LC noise filter with terminals formed thereon.

FIG. 7 is an exploded view of an LC noise filter having a different slit pattern which is formed in the second conductor functioning as a grounding conductor.

FIGS. 19(a) to (l) illustrate the process of making a laminate type LC element by coating a substrate with materials of conductive element and insulator layer by the use of a film forming technique.

FIGS. 22(a) to (f) illustrate the process of making the prior art LC noise filter.

FIG. 23 is a diagram of the equivalent circuit in the LC element shown in FIG. 22.

DETAILED DESCRIPTION OF THE PREFERRED EMBODIMENTS

Figure 1:
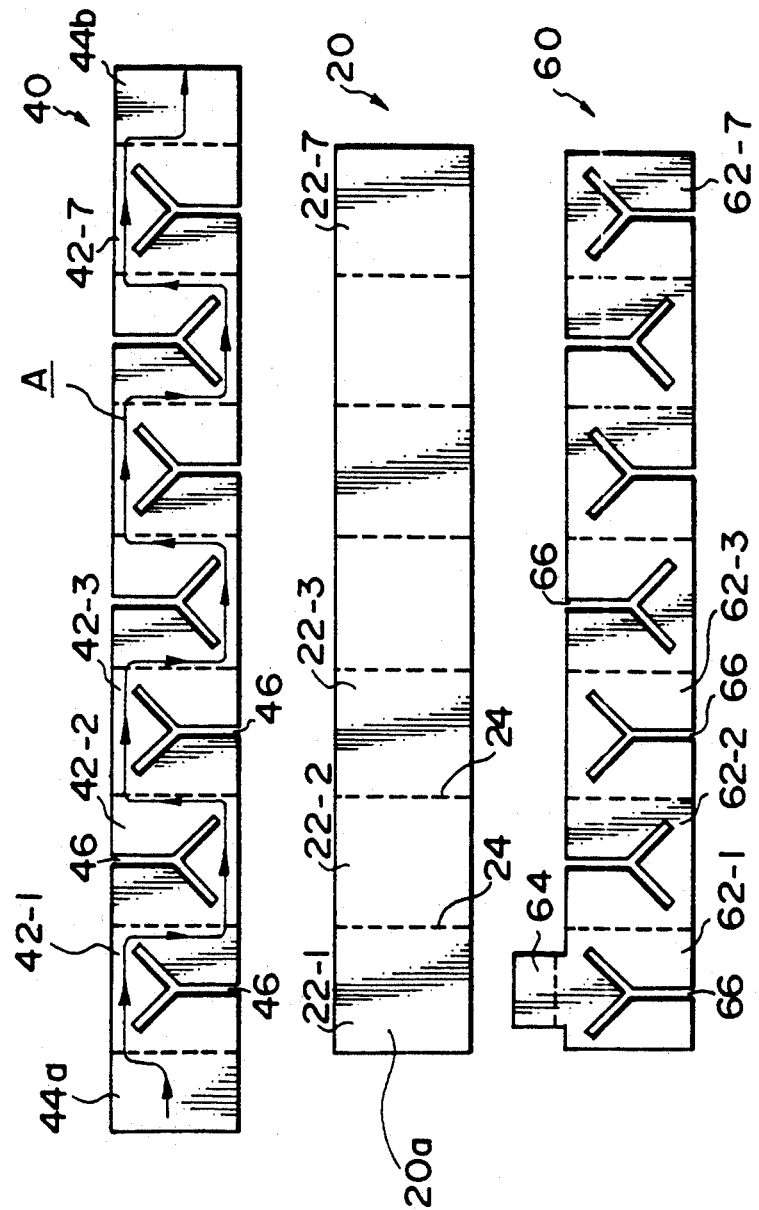
FIG. 1 is an exploded view of a three-terminal normal mode type LC noise filter to which the present invention is applied.

The present invention will now be described in detail in connection with some preferred embodiments thereof which are illustrated in the drawings.

First Embodiment

The first embodiment is characterized by that an LC element includes a laminate in which a single insulating sheet is folded into a plurality of oppositely folded and stacked sheet sections.

First Concrete Form

FIGS. 1 and 2(A)-2(D) show a preferred configuration of a three-terminal normal mode type LC noise filter constructed in accordance with the present invention.

On making this LC noise filter, a first continuous insulating sheet 20 is first prepared, as shown in FIG. 1. The first insulating sheet 20 comprises a plurality of insulating layers 22-1, 22-2, ... 22-7 separated from one another through folding lines 24. The folding lines 24 are perforated in order to facilitate the folding of the first insulating sheet 20. Although each of the insulating layers 22 is shown to be of a square configuration in this embodiment, it may be of any other suitable configuration if it can be folded into a desired laminate.

A first continuous conductor 40 is formed on the surface 20a of the first insulating sheet 20 and includes a plurality of first sheet-like conductive elements 42-1, 42-2, ... 42-7. Each of the conductive elements includes a preselected slit pattern 46 formed therein. When the first conductor 40 is oppositely folded and stacked together with the first insulating sheet 20, the slit patterns 46 in the respective conductive elements form a coil having a preselected number cf turns (3.5 turns in the illustrated embodiment). In the illustrated embodiment, the slit patterns 46 are of Y-shaped configuration. These Y-shaped slit patterns 46 are alternately oriented in the opposite directions to form an electric path on the first conductor 40, as shown by A in FIG. 1. The first conductor 40 also includes input/output leads 44a and 44b formed therein at the opposite ends.

A second continuous conductor 60 is formed on the opposite surface of the first insulating sheet 20 and includes a plurality of second sheet-like conductive elements 62-1, 62-2, ... 62-7 formed therein, each of which is arranged at a position corresponding to one of the insulating layers 22-1, 22-2, ... 22-7 on the first insulating sheet 20. The conductive elements 62-1, 62-2, ... 62-7 on the second conductor 60 are thus disposed face-to-face relative to the respective conductive elements 42-1, 42-2, ... 42-7 on the first conductor 40 through the respective insulating layers 22-1, 22-2, ... 22-7 to form a sufficient large distributed-constant capacitance therebetween. The second conductor 60 also includes a grounding lead 64 formed therein at one end.

In the illustrated embodiment, each of the second conductive elements 62-1, 62-2, ... 62-7 has a Y-shaped slit pattern 66 formed therein and being similar to those of the first conductive elements 42-1, 42-2, ... 42-7. The Y-shaped slit pattern 60 in each of the second conductive elements is oriented in the same direction as that of the corresponding first conductive element in the first conductor 40.

The first and second conductors 40 and 60 may be coated and formed on the opposite surfaces of the first insulating sheet 20 by means of any suitable means such as printing, etching, plating or the like. Alternatively, these conductors may be formed by applying conductive sheets having such patterns as shown in FIG. 1 on the opposite surfaces of the first insulating sheet 20.

Further insulating layers (not shown) for preventing any short-circuit are coated and formed on the surfaces of the first and second conductors 40 and 60. Alternatively, second and third insulating sheets similar to the first insulating sheet 20 may be provided. In such a case, the first and second insulating sheets are laminated and adhered to each other with the first conductor 40 sandwiched therebetween while the first and third insulating sheets are laminated and adhered to each other with the second conductor 60 sandwiched therebetween. For simplification, the arrangement described below does not have the second and third insulating sheets.

Figure 2A:
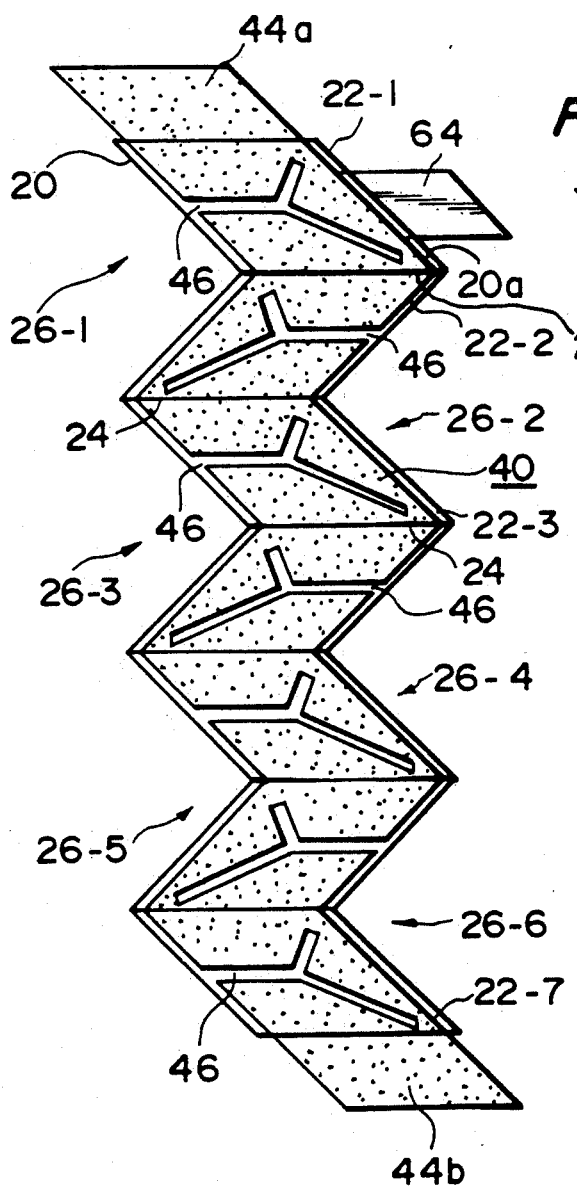
FIGS. 2(A) to 2(D) illustrates the process of making the noise filter shown in FIG. 1.
Figure 2B:
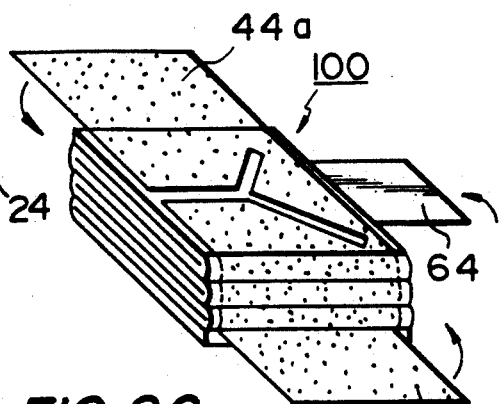

After the first and second conductors 40 and 60 have been formed on the opposite surfaces of the first insulating sheet 20, the laminated assembly is oppositely folded at the folding lines 24 as shown in FIG. 2(A) to form a laminate 100 shown in FIG. 2(B).

It is preferred that the adjacent and opposed insulating layers are bonded by any suitable insulating adhesive, as shown by 26-1, 26-2, ... 26-7 in FIG. 2(A).

Figure 2C:
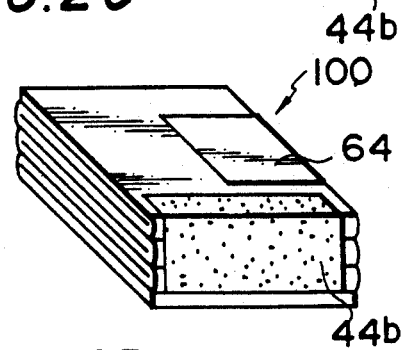

The leads 44a, 44b and 64 externally extending from the laminate 100 shown in FIG. 2(B) are then sequentially folded in the respective directions shown by arrows to form an LC element shown in FIG. 2(C). The folded leads 44a, 44b and 64 are preferably bonded to the laminate 100 by any suitable insulating adhesive. The external faces of the leads 44a, 44b and 64 must not be coated with insulating layers since the leads should have their good conductive states.

Figure 2D:
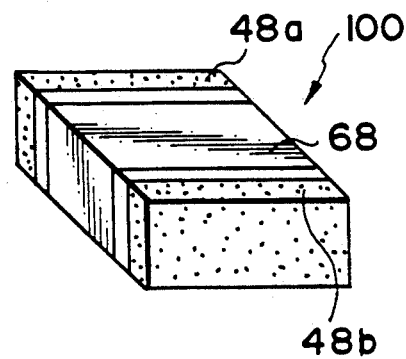

As shown in FIG. 2(D), the surface of the laminate 100 is then treated to form input/output terminals 48a, 48b and a grounding terminal 68, which terminals are electrically connected with the respective leads 44a, 44b and 64.

In such a manner, there is provided an LC element of a small-sized surface mount device (SMD) type which is very useful in recent automated circuit assembling processes.

In the LC element of this embodiment, the respective terminals 48a, 48b and 64 are soldered directly to the circuit substrate, but may be connected to the substrate through any suitable connecting pin structure, if required.

Figure 3A:
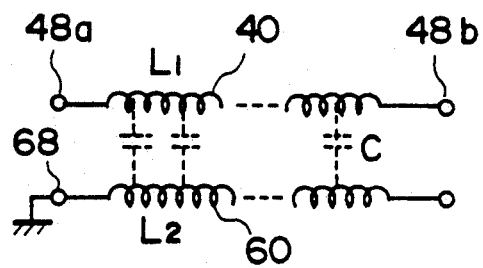
FIG. 3(A) is a diagram of the equivalent circuit in the three-terminal type LC noise filter shown in FIGS. 1 and 2.

FIG. 3(A) shows the equivalent circuit of the LC element according to this embodiment. In this LC element, the first sheet-like conductive elements 42-1, 42-2, ... 42-7 each including the Y-shaped slit pattern 46 are continuously wound from one insulating layer 22 to another. Thus, the first conductor 40 will form a coil having a preselected turns (3.5 turns in this embodiment) and function as an inductor having an inductance L1.

Similarly, the second conductor 60 having the Y-shaped slit patterns 66 will form a coil having a preselected number of turns (3.5 turns in this embodiment) and function as another inductor having an inductance L2.

Since the first and second conductors 40, 60 are arranged in the face-to-face relationship, there can be provided an increased capacitance therebetween through the first insulating sheet 20. And yet, it is believed that the capacitance is of a distributed constant type between the first and second conductors 40, 60.

As a result, the LC element of this embodiment functions as a three-terminal LC noise filter having the equivalent circuit as shown in FIG. 3(A). Particularly, since it is believed that the sufficiently large capacitance C is formed between the first and second conductors 40, 60 with the distributed constant, the LC noise filter can have an attenuation superior to that of the conventional lumped constant type filters.

In the noise filter of the embodiment, the first and second conductors 40, 60 include Y-shaped slit patterns 46 which define a magnetic path located at the central portions of the first and second conductors 40, 60 and functioning as a coil which extends and winds from the forward face to the backward face of the laminate 100. In other words, the Y-shaped slit patterns 46 serves as means for preventing the magnetic path in the first and second conductors 40, 60 from being blocked by the conductors. Therefore, the inductance will not be reduced even if the first and second conductors 40, 60 are arranged in the face-to-face relationship through the insulating layers 22.

In such a manner, the LC noise filter of this embodiment will have inductances L1 and L2 formed by the first and second conductors and an increased capacitance C formed between the first and second conductors to provide a distributed constant. Thus, the LC noise filter can have a superior characteristic of attenuation.

The inventors have further studied a normal mode type noise filter in which one of the conductors 60 is grounded. As a result, it has been found that the attenuation of the noise filter can be highly affected by the position of the first conductor 40 as an energizing inductor to which the second conductor 60 as a grounding conductor is placed in the face-to-face relationship.

In other words, the second conductor 60 may be formed not only opposed to the whole of the first conductor 40, but also opposed to part of the first conductor 40, if necessary. In such a case, it has been verified that a superior attenuation could be provided by disposing the second conductor 60 at a position electrically near the input/output terminals 48a, 48b of the first conductor 40.

The inventors have further studied what configuration the grounding terminal 68 of the second conductor 60 should be formed into. It has been found that a good attenuation could be provided when the grounding terminal 68 is located at a position electrically near either of the input/output terminals 48a or 48b.

Second Concrete Form

Although Y-shaped slit patterns 66 are formed in the conductive elements 42 and 62 of the first and second conductors 40 and 60 in the first concrete form, the present invention may use any suitable configuration of slit pattern.

Figure 4:
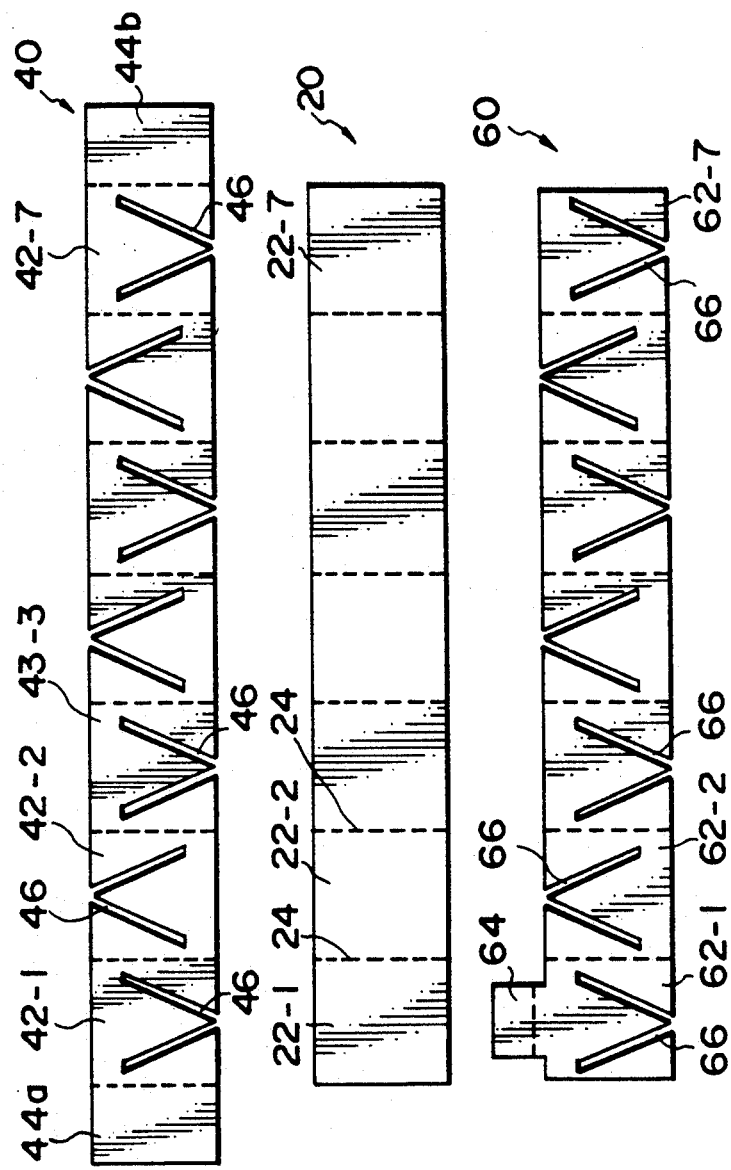
FIG. 4 is an exploded view of an LC noise filter having a different conductive pattern.

FIGS. 4 and 5(A)-5(D) illustrate V-shaped slit patterns 46 and 66 formed in the conductive elements 42 and 62. FIG. 4 is an exploded view of an LC noise filter formed with a different conductive pattern while FIGS. 5(A) to (D) show the process of making the LC noise filter shown in FIG. 4.

Figure 5A:
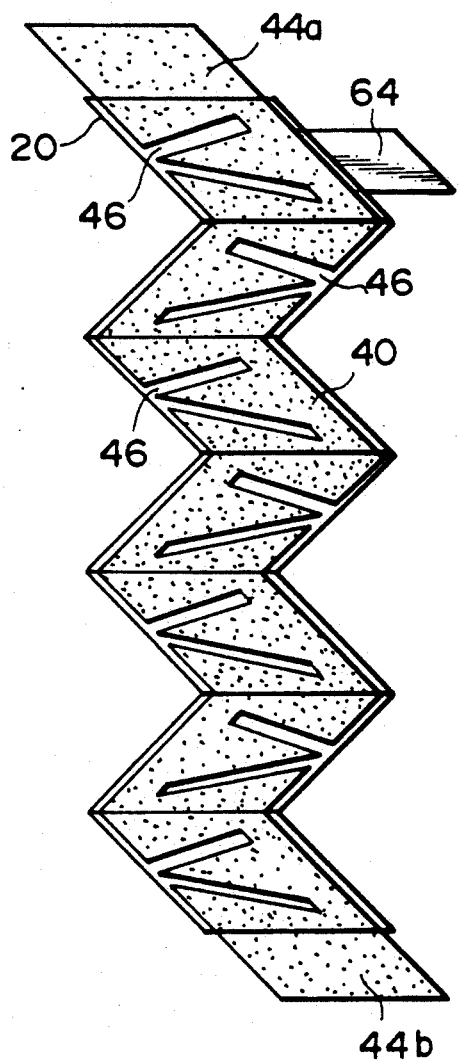
FIGS. 5(A) to (D) illustrate the process of making the LC noise filter shown in FIG. 4.
Figure 5B:
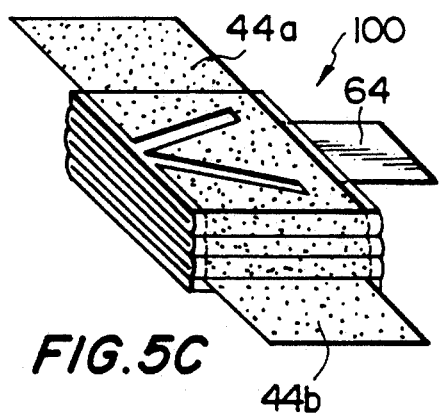
Figure 5C:
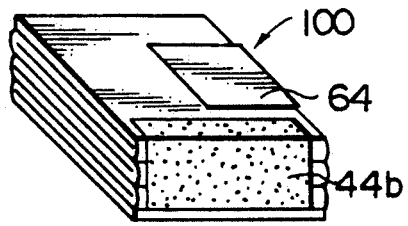
Figure 5D:
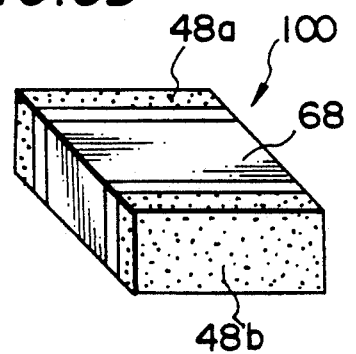
Figure 6A:
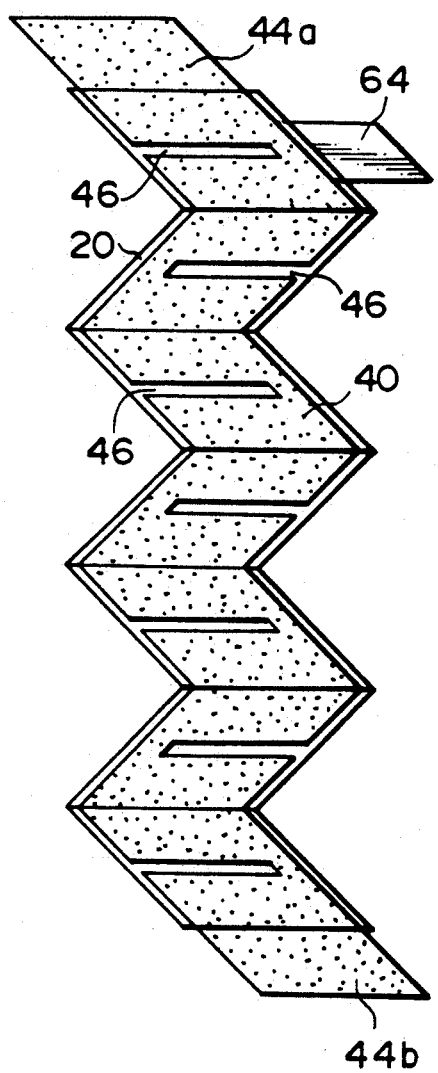
FIGS. 6(A) to (D) illustrate an LC noise filter having a still different conductive pattern.
Figure 6B:
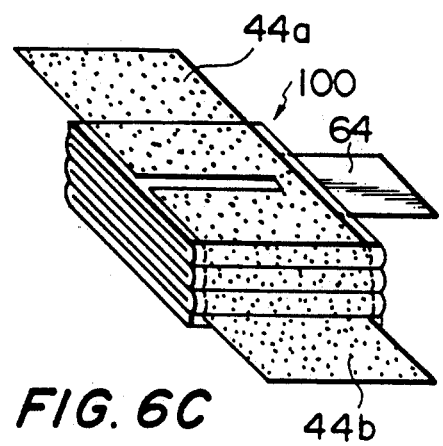
Figure 6C:
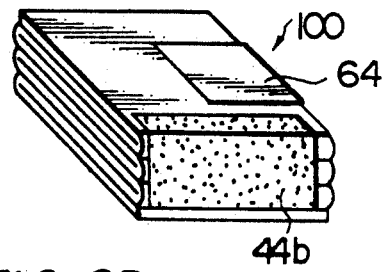
Figure 6D:
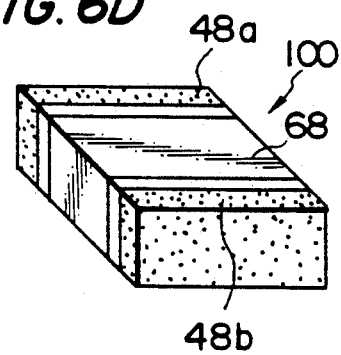

As in the first concrete form, first and second conductors 40, 60 are formed on the opposite sides of the first insulating sheet 20. Each of the first and second conductors 40, 60 includes V-shaped slit patterns 46 or 66 formed therein which are alternately oriented in the opposite directions. The assembly thus laminated is then folded zigzag as shown in FIG. 5(A) to form such a laminate type LC noise filter as shown in FIGS. 5(B)-(D).

Alternatively, the first conductor 40 may have I-shaped slit patterns 46 which are alternately oriented in the opposite directions, as shown in FIGS. 6(A)-6(D). Similarly, the second conductor may have I-shaped slit patterns alternately oriented in the opposite directions although not illustrated. This also provides a laminate type LC noise filter having its good characteristics, as in the first concrete form.

Although the previous concrete forms have been described as to the same slit pattern formed in the first and second conductors 40, 60, it is to be understood that different slit patterns can be formed in the first and second conductors 40, 60.

FIG. 7 shows such a concrete form wherein Y-shaped slit patterns 46 are alternately formed on the first conductor 40 in the opposite directions while circular slit patterns 66 are formed on the second conductor 60 at positions opposite to the respective Y-shaped slit patterns 46. The first and second conductors 40, 60 are placed on the opposite sides of the first insulating sheet 20 to form a laminated assembly. When the laminated assembly is folded and stacked to form a laminate 100, the first conductor 40 will function as a coil in which a magnetic path extending from the forward face to the backward face of the laminate 100 through the slit patterns 46 and 66 is formed at the center of the coil. Thus, there can be provided a three-terminal normal mode type noise filter which has a sufficiently large capacitance C without reduction of the inductance in the first conductor 40.

If the reduction of inductance in the first conductor 40 functioning as an energizing path is not required to be considered, the second conductor 60 may have no slit pattern 66.

Third Concrete Form

Figure 8:
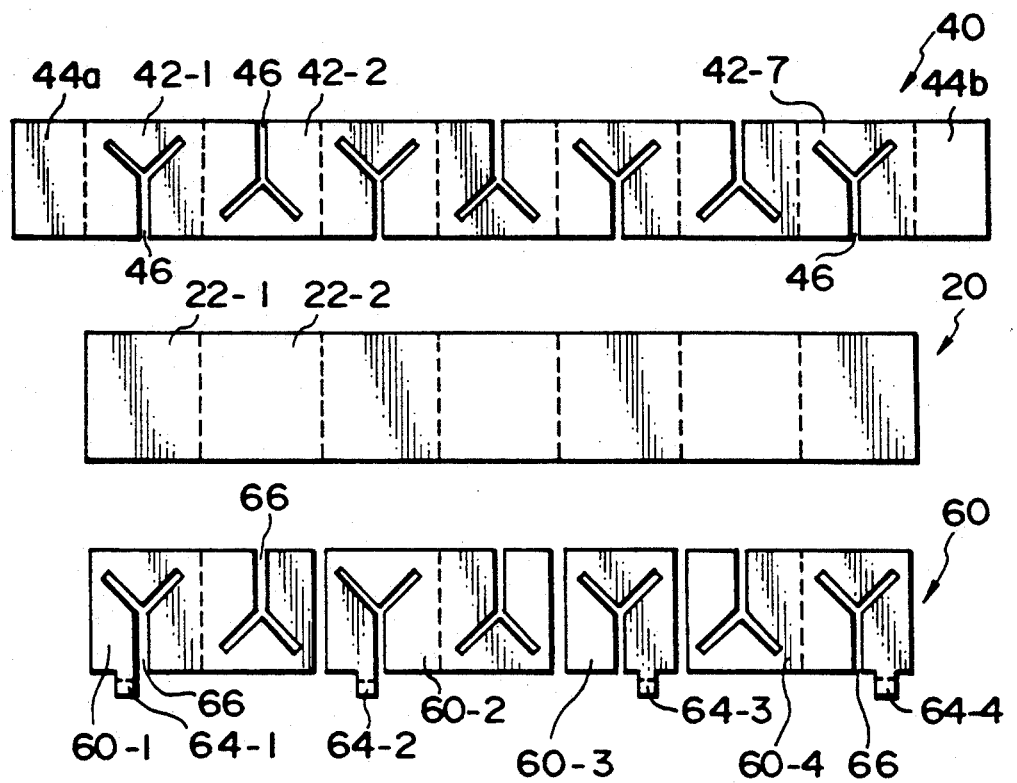
FIG. 8 is an exploded view of an LC noise filter in which the second conductor functioning as a grounding conductor is divided into a plurality of grounding conductor sections.
Figure 9:
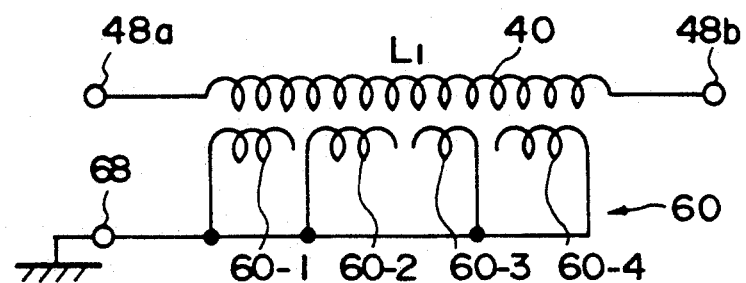
FIG. 9 is a diagram of the equivalent circuit in the divided grounding type LC noise filter shown in FIG. 8.

FIGS. 8 and 9 shows the third concrete form in which parts similar to those of the previous concrete forms are denoted by similar reference numerals and will not be further described.

The third concrete form provides a normal mode type LC noise filter as in the previous concrete forms.

The third concrete form is characterized by that the second conductor 60 functioning as a grounding conductor is divided into a plurality of grounding conductor sections 60-1, 60-2, 60-3 and 60-4 each of which includes a grounding lead 64-1, 64-2, 64-3 or 64-4.

The insulating sheet 20 is sandwiched between the first and second conductors 40, 60 to form a laminated assembly which is in turn folded and stacked to form a laminate, as in the previous concrete forms. The grounding leads 64-1, 64-2, 64-3 and 64-4 are connected together to form a single grounding terminal 68.

The resulting LC noise filter can have a more increased capacitance since the self-inductance L of each of the grounding conductor sections 60-1, 60-2, 60-3 and 60-4 is small with the capacitance formed between these conductor sections and the first conductor 40 in the distributed constant manner being capable of being used directly.

The inventors have found that the attenuation of the noise filter was highly affected by the positions of the grounding conductor sections 60-1, 60-2, 60-3 and 60-4 relative to the first conductor 40 functioning as an inductor. The inventors verified that the attenuation is improved when the grounding conductor sections 60-1, 60-2, 60-3 and 60-4 are disposed at positions electrically near the input/output terminals of the first conductor 40.

The inventors further studied what configuration the grounding leads 64-1, 64-2, 64-3 and 64-4 in the grounding conductor sections 60-1, 60-2, 60-3 and 60-4 should be formed into. The inventors have found that the grounding conductor sections 60-1 and 60-2 located at positions electrically near one of the input/output terminals 48a (lead 44a) preferably have the grounding leads 64-1 and 64-2 located at positions electrically nearer the input/output terminal 48a (lead 44a) while the other grounding conductor sections 60-3 and 60-4 preferably have the grounding leads 64-3 and 64-4 located at positions electrically nearer the other input/output terminal 48b (lead 44b).

In such a manner, the LC noise filter of this concrete form will have its equivalent circuit shown in FIG. 9 and function as a normal mode type filter having an improved attenuation property.

Fourth Concrete Form

FIG. 2(B) shows the fourth concrete form of an LC noise filter constructed in accordance with the present invention which is characterized by a common mode type LC noise filter.

In other words, the LC noise filter of the fourth concrete form includes not only the input/output terminals in the opposite ends of the first conductor 40, but also input/output terminals 68a and 68b in the opposite ends of the second conductor 60.

The first and second conductors 40, 60 function as inductor conductors of L1 and L2, respectively. Thus, an increased capacitance C is formed between the first and second conductors 40, 60 in the distributed constant manner.

Therefore, the LC noise filter of the fourth concrete form will function as a four-terminal common mode type LC noise filter having an improved attenuation.

Fifth Concrete Form

Figure 10:
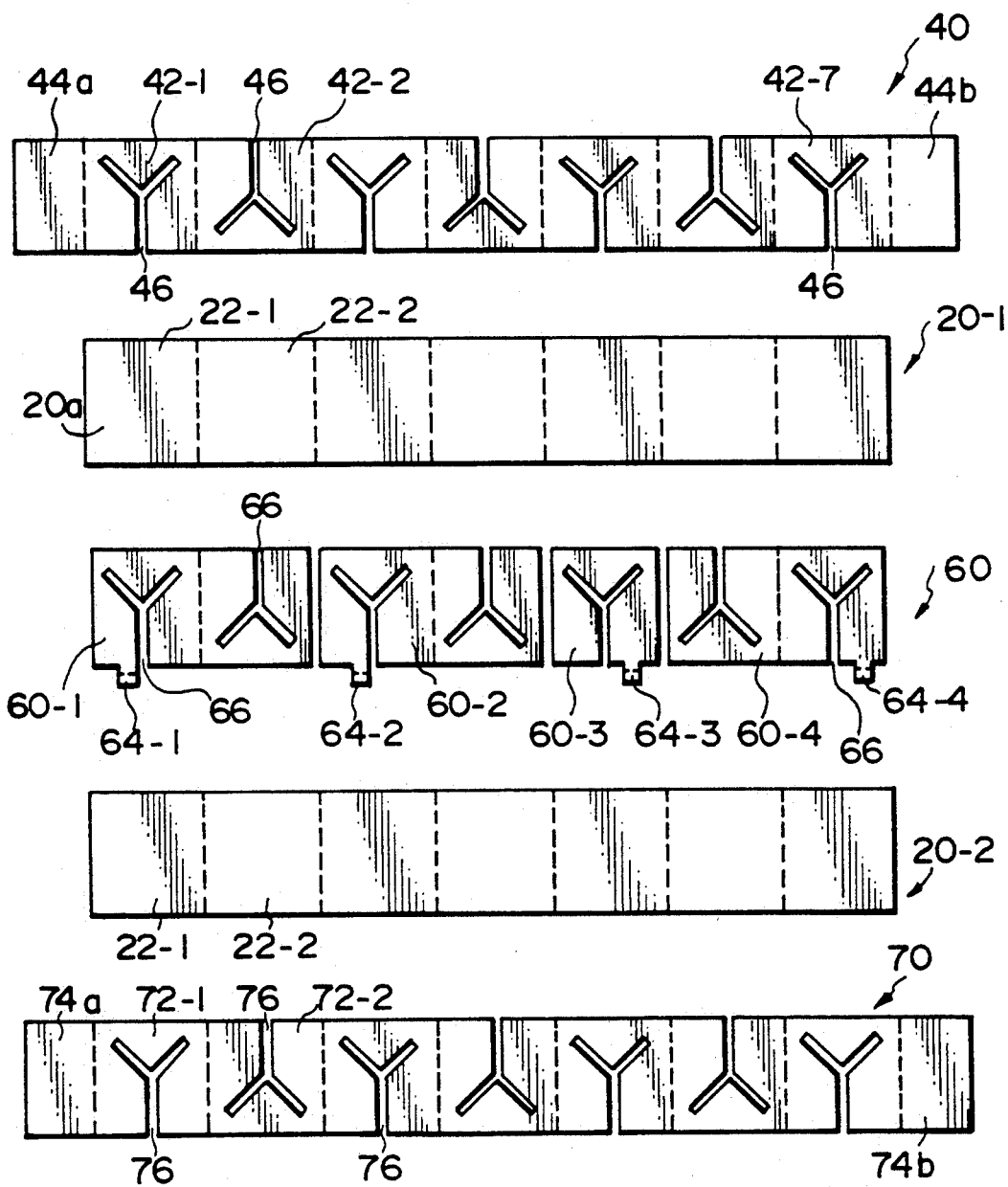
FIG. 10 is an exploded view of an LC noise filter comprising two energizing conductors and a grounding conductor.
Figure 11:
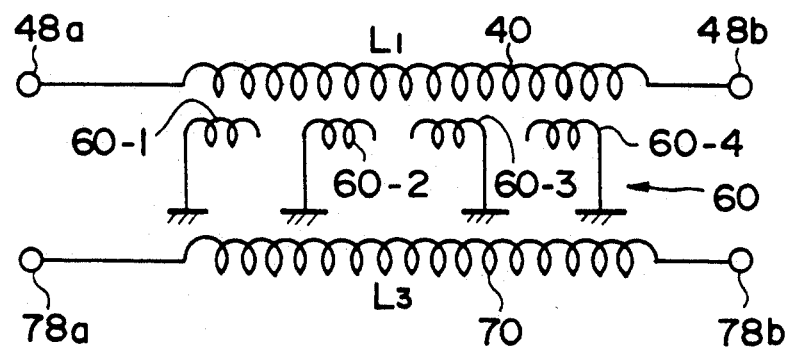
FIG. 11 is a diagram of the equivalent circuit in the LC noise filter shown in FIG. 10.

FIGS. 10 and 11 shows the fifth concrete form of an LC noise filter constructed in accordance with the present invention, in which parts similar to those of the first to fifth concrete forms are designated by similar reference numerals and will not be further described.

As shown in FIG. 10, the LC noise filter of the fifth concrete form comprises the first insulating sheet 20-1 having the same structure as those of the previous concrete forms and the second insulating sheet 20-2. The first conductor 40 is coated and formed on the forward surface 20a of the first insulating sheet 20-1 as in the previous concrete forms. Similarly, the third conductor 70 is coated and formed on the forward surface of the second insulating sheet 20-2 in the same pattern as that of the first conductor 40. In FIG. 10, reference numerals 72-1, 72-2, ... 72-7 denote the third conductive elements; 74a and 74b input/output leads; 76 slit patterns; and 78a and 78b input/output terminals, respectively.

The second conductor 60 functioning as a grounding conductor is sandwiched and bonded between the first and second insulating sheets 20-1, 20-2. The laminated assembly thus formed is then folded zigzag to form a laminate. The laminate is further worked to form an SMD type filter in the same manner as in the previous concrete forms.

FIG. 11 shows the equivalent circuit of the resulting common mode type LC noise filter. As shown in FIG. 11, the first and third conductors 40, 70 function as inductor conductors of L1 and L3, respectively. A capacitance C is formed between the first and second inductor conductors 40, 70 and the second conductor 60 in the distributed constant manner.

The LC noise filter of the fifth concrete form will thus function as a common mode type LC noise filter having an improved attenuation.

Other Concrete Forms

The first embodiment is not limited to the aforementioned concrete forms and may be applied to any other forms.

After the inductor conductors 40 and 60 have been placed on the insulating sheet, conductor insulating sheets may be placed respectively on the insulating sheets 20-1 and 20-2 to cover the inductor conductors 40 and 60. These conductor insulating sheets are preferably of the same structure as that of the insulating sheet 20.

If the insulating sheet is formed of a material capable of absorbing electromagnetic waves and also emitting heat, the noise filter of the present invention can have a further improved performance for high-frequency bands.

Although the previous concrete forms have been described as to the use of a continuous insulating sheet 20 including a plurality of insulating layers 22-1, 22-2 .. . 22-8 which are connected with one another through folding lines, these insulating layers 22-1, 22-2 ... 22-8 may be separated from one another. In such a case, the first and second conductors 40, 60 similar to those of the first concrete form may be used. The first and second conductors 40, 60 are bonded on the opposite sides of the first insulating sheet 20 at positions corresponding to the insulating layers 22-1, 22-2, ... 22-8. Thus, the insulating layers 22-1, 22-2, ... 22-8 of the first insulating sheet 20 are connected together through the first and second conductors 40, 60. The first insulating sheet 20 thus formed is zigzag folded and stacked to form a laminate, as in the first concrete form. Therefore, the present invention provides an LC noise filter similar to the first concrete form.

It is preferred that the first conductor 40 has been previously coated with an insulating film and that the first and second conductors 40, 60 are formed not to create any shortcircuit at a gap between the adjacent insulating layers 22-1, 22-2 ... 22-8.

Second Embodiment

The second embodiment is characterized by that a laminate comprises a plurality of separated insulating plates which are stacked one above another.

Figure 12:
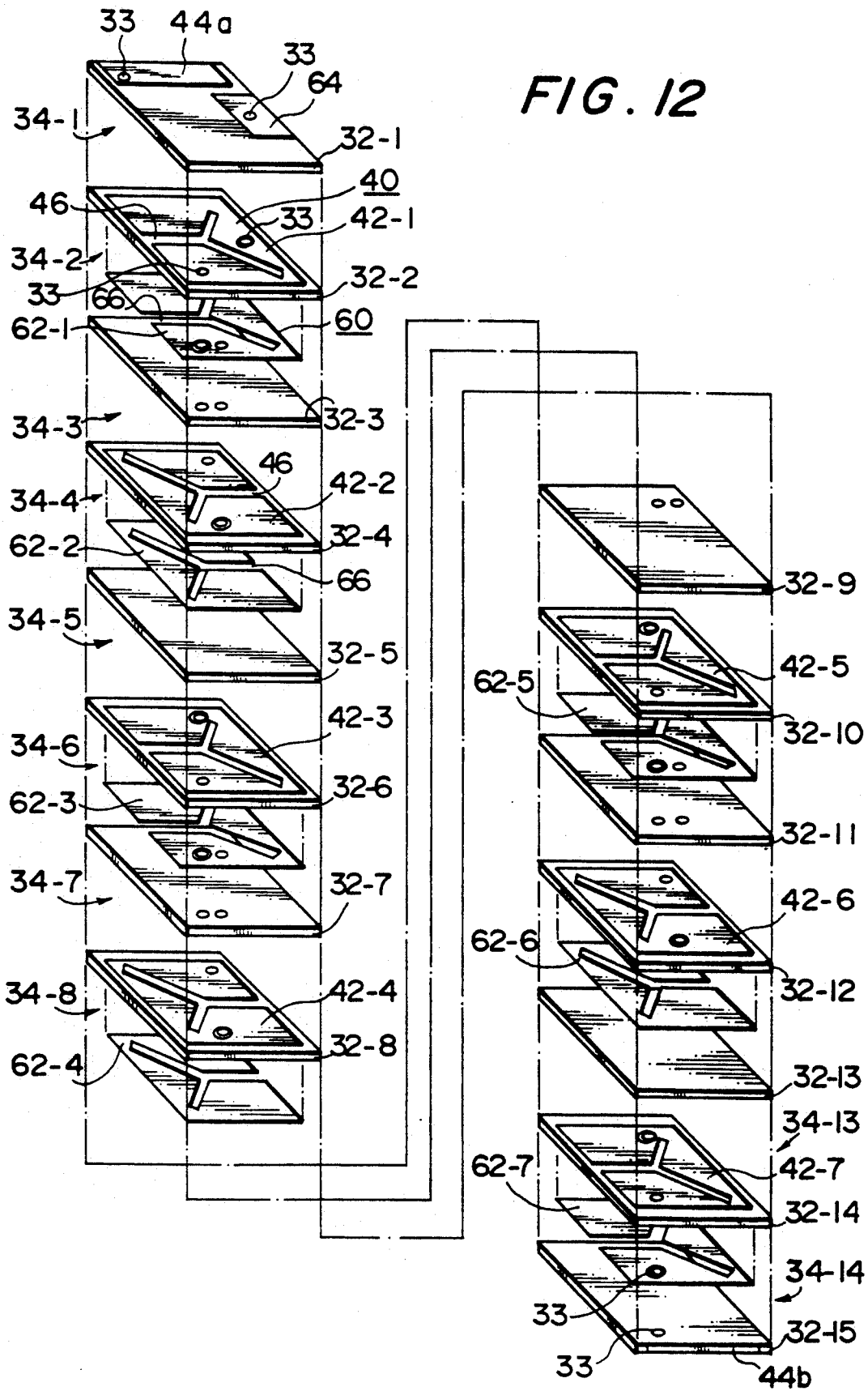
FIG. 12 is an exploded and perspective view of a second preferred embodiment of a laminate type LC element constructed in accordance with the present invention.

Referring now to FIGS. 12 and 13, there is shown an LC element which comprises a laminate 100 consisting of a plurality of stacked separate insulating plates 32-1, 32-2, ... 32-15; a first conductor 40 for forming a coil having a preselected number of turns between the insulating plates 32 at 34-1, 34-3, 34-5, ... 34-15; and a second conductor 60 disposed opposite to the first conductor 40 through the insulating plates 32 at 34-2, 34-4, ... 34-14.

The insulating plates 32 may be formed of any one of various known insulating materials, if necessary. These insulating materials include ceramics, plastic and various other synthetic resins. In the first concrete form, the insulating plates 32 is made of ceramics.

The uppermost and lowermost insulating plates 32-1 and 32-15 include leads 44-a and 44-b of the first conductor 40 and a lead 64 of the second conductor 60, which leads are coated and formed on the surfaces of the insulating plates.

The first conductor 40 comprises a plurality of first conductive elements 42-1, 42-2, ... 42-7 each of which continuously winds and extends from one gap between the adjacent insulating layers to another in the insulating plates 32 at 34-1, 34-3, ... 34-13.

The second conductor 60 comprises a plurality of second conductive elements 62-1, 62-2, ... 62-7 each of which continuously winds and extends from one gap between the adjacent insulating layers to another in the insulating plate 32 at 34-2, 34-4, ... 34-14.

It is to be noted that the first and second conductive elements 42, 62 are formed in the face-to-face relationship through the insulating plate 32 to form a relatively large capacitance therebetween substantially in a continuous manner.

More particularly, slit patterns 46 and 66 similar to those of the first embodiment are formed in the first and second conductive elements 42, 62 placed in the face-to-face relationship. Each of these conductive elements 42, 62 continuously winds and extends from one gap between the adjacent insulating layers to another.

Each of the first and second conductors 40, 60 functions as a coil having a preselected number of turns. A capacitance C is substantially continuously formed between the first and second conductors 40, 60 through the insulating plate 32 and yet probably of a distributed constant between the first and second conductors 40, 60.

The first and second conductive elements 42, 62 are coated and formed on the opposite sides of the insulating plate 32 in the face-to-face relationship by the use of any suitable means such as printing, depositing, plating or the like. The lead 44a formed on the surface of the insulating plate 32-1 is connected to the first conductive element 42-1 on the insulating plate 32-2 through a through-hole 33. Similarly, the lead 44b on the lowermost insulating plate 32-15 is connected to the first conductive element 42-7 formed on the insulating plate 32-8 through a through-hole 33. The grounding lead 64 formed on the uppermost insulating plate 32-1 is connected to the second conductive element 62-1 on the backside of the insulating plate 32-2 through through-holes 33 which are formed through the insulating plates 32-1 and 32-2. The first and second conductive elements 42, 62 on the respective insulating plates 32-2, 32-4, . . . 32-14 are electrically connected to wind from one gap between the adjacent insulating layers to another through the through-holes 33 which are formed on the insulating plates 32-2, 32-3, . . . 32-15.

Figure 13A:
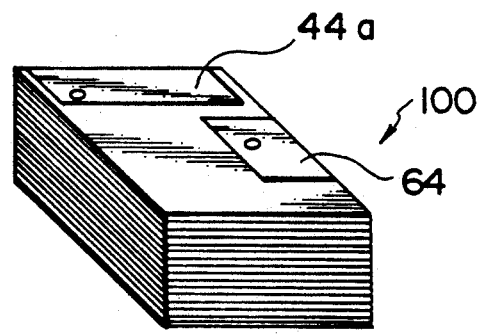
FIGS. 13(A) and (B) illustrate the process of assembling the laminate type LC element shown in FIG. 12.
Figure 13B:
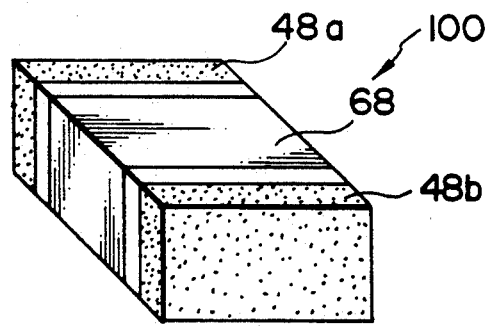

After the laminate 100 of FIG. 13(A) formed by the stacked separate insulating plates 32-1, 32-2, . . . 32-15 has been surface treated as shown in FIG. 13(B), terminals 48a, 48b and 68 are formed and electrically connected to the respective leads 44a, 44b and 64.

In such an arrangement, the first conductor 40 is connected, at its opposite ends, to input/output terminals 48a and 48b and functions as a coil having a preselected inductance L1. Similarly, the second conductor 60 is connected, at one end, to the terminal 68 and functions as a coil having a preselected inductance L2.

In accordance with the present invention, particularly, the first and second sheet-like conductive elements 42, 62 are placed in the face-to-face relationship through the insulating plate 32. Thus, the capacitance C can be fully increased, in comparison with the prior art laminate type LC element. Furthermore, it is believed that the capacitance C is substantially continuously formed between the first and second conductors 40, 60 in the distributed constant manner.

Therefore, the laminate type LC element of the present invention can perform superior characteristics which would not be provided by the prior art lumped constant type LC element. When the laminate type LC element is used as an LC noise filter, it can have a superior attenuation over a widened band range.

Figure 14:
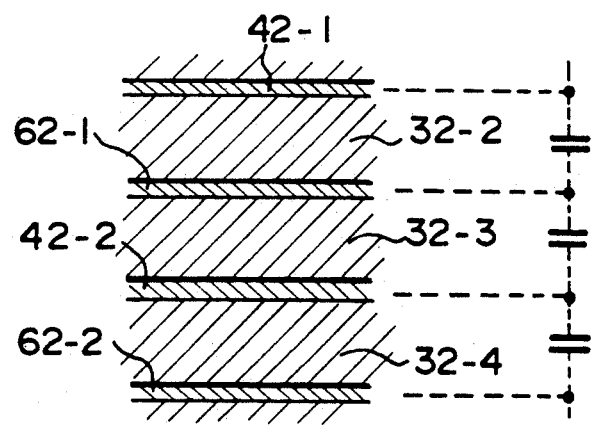
FIG. 14 illustrates the three-dimensional arrangement of each of the conductive elements shown in FIGS. 12 and 13.

In this embodiment, for example, the conductive elements 42 and 62 are three-dimensionally arranged as shown in FIG. 14. For example, the first conductive element 42-2 is disposed opposite to the second conductive element 62-1 to form a capacitance through the insulating plate 32-3 and also to form another capacitance between the first conductive element 42-2 and the second conductive element 62-2 located below the second conductive element 62-1. Thus, each of the first conductive elements 42 can form capacitances between that first conductive element 42 and the second conductive elements 62 located above and below the first conductive element 42 and also on the opposite sides thereof. This results in increase of the entire capacitance in the limited space between the first and second conductive elements 42, 62.

Figure 15:
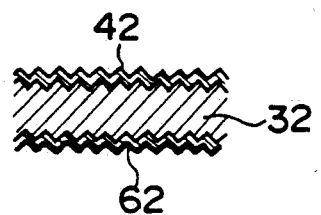
FIG. 15 illustrates the conductive element having its effective coating area which is increased by coating the material of the conductive element on the roughed surface of the substrate.
Figure 16C:
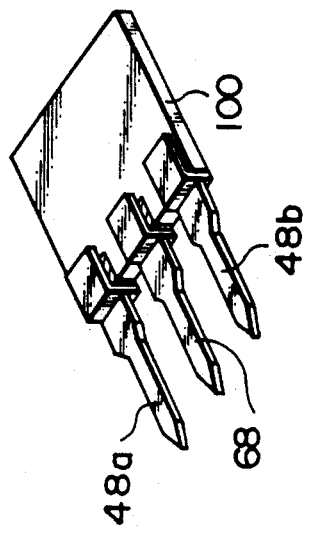
FIGS. 16(a) to (d) illustrate a laminate type LC element formed into a discrete configuration.
Figure 16D:
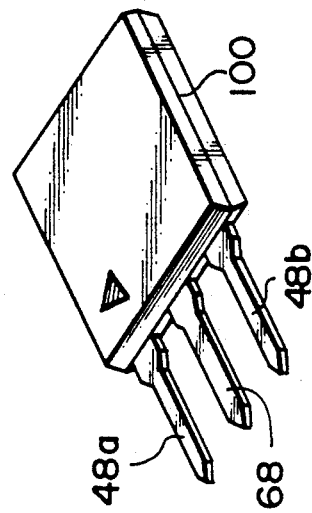
Figure 16A:
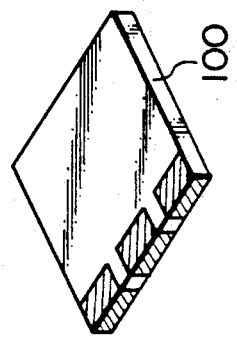
Figure 16B:
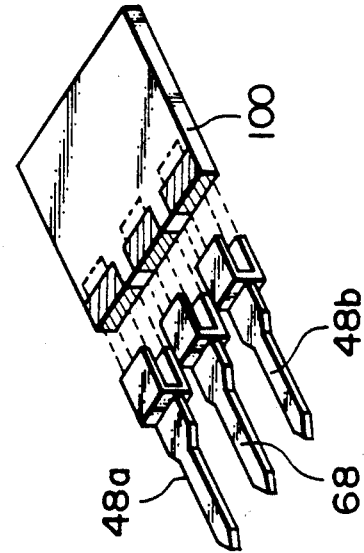

In order to increase the capacitance C in the LC element, it is preferred that the surfaces of the insulating plate 32 are roughed as by etching, as shown in FIG. 15. When the roughed surfaces of the insulating plate 32 are covered with the conductive elements 42 and 62, the conductive elements 42 and 62 will be placed opposite to each other over an widened area. Thus, the LC element of the same size can provide a further increased capacitance C.

Thus, the present invention can provide an LC element in which the large capacitance C is formed in the distributed constant manner. The capacitance C can be further increased depending on the need without increase of the LC element itself in size. This provides a laminate type LC element having its characteristics superior to the prior art laminate type LC element.

When such an LC element is used in a noise filter, it can have an improved attenuation over a widened band range and provide an advantage in that the noise can be more effectively removed than the prior art lumped constant type LC elements.

The laminate type LC element of this embodiment can be used not only as a normal mode type LC noise filter, but also as a common mode type LC noise filter.

More particularly, the laminate type LC element of this embodiment can be used as a normal mode type LC noise filter having L and C formed in the distributed constant manner by grounding the terminal 68 as shown in FIG. 3(A).

Figure 3B:
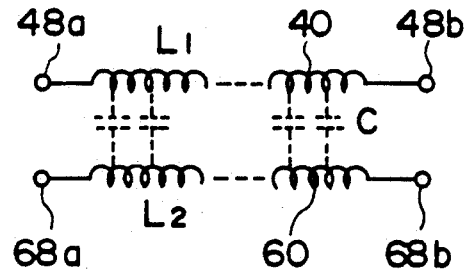
FIG. 3(B) is a diagram of the equivalent circuit of a four-terminal type filter formed from the modulation of the noise filter shown in FIGS. 1 and 2.

As shown in FIG. 3(B), furthermore, the laminate type LC element of this embodiment can be used as a four-terminal common mode type LC noise filter having a capacitance which is formed between the conductors in the distributed constant manner by forming the terminals 68a and 68b on the opposite ends of the second conductor 60 and by using these terminals as input-/output terminals.

FIG. 13 shows a three-terminal normal mode type LC noise filter in which the laminate type LC element of this embodiment is used.

As shown in FIG. 13(A), a laminate 100 is formed by stacking and bonding the insulating plates 32 shown in FIG. 12. Thereafter, the input/output leads 44a and 44b formed on the opposite sides of the laminate 100 are coated with a conductive material so that these input-/output leads can function as the input/output terminals 48a and 48b. Similarly, the lead 64 is coated with a conductive material so as to function as a grounding terminal 68.

In such a manner, there can be formed a three-terminal type noise filter having two input/output terminals 48a, 48b and one grounding terminal 68 which are formed on the outer periphery of the laminate 100. Since the noise filter is formed as a SMD type element, it can be very easily handled.

Although the second embodiment has been described as to the through-holes 33 for connection, these through-holes may be replaced by conductive caps or by conductive patterns which are formed by plating, printing, painting or the like. Further, any combination of these means may be used.

Although the above embodiment has been described as to the coating of the terminals 48a, 48b and 68 through the entire outside of the laminate 100 as shown in FIG. 13, these terminal patterns may be formed into any suitable configuration, if necessary.

Although the aforementioned embodiment has been described as to the SMD type element usable as the laminate type LC element constructed according to the present invention, the present invention is not limited to such an arrangement and may be applied to a discrete type element in which the terminals 48a, 48b and 68 are of a pin-connection type, as shown in FIG. 16. FIGS. 16(a) to (d) illustrate a procedure of mounting the pin-connection type terminals 48a, 48b and 68.

Figure 17:
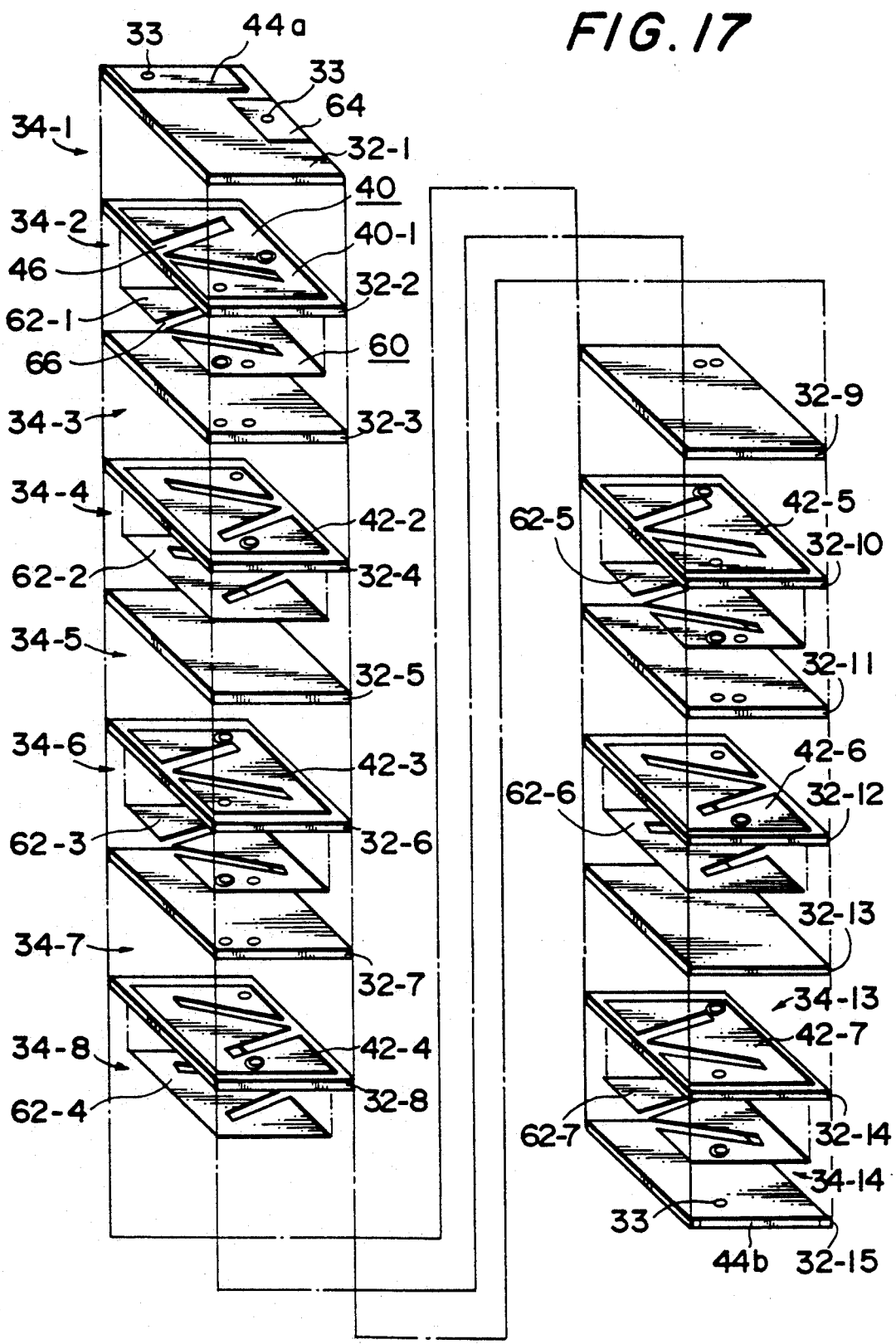
FIG. 17 is an exploded and perspective view of a laminate type LC element formed with a slit pattern different from that of FIG. 12.
Figure 18:
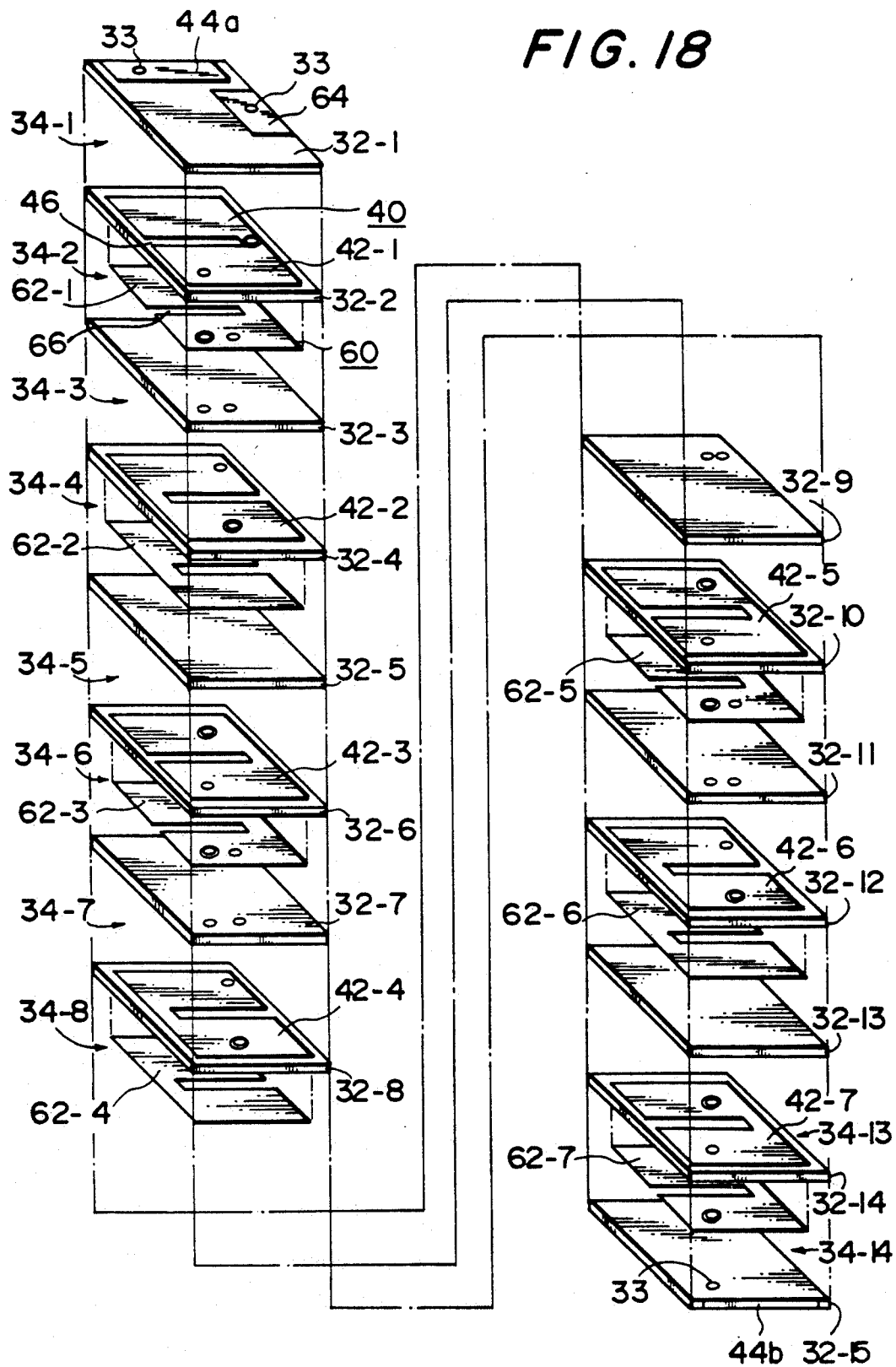
FIG. 18 is an exploded and perspective view of a laminate type LC element formed with a slit pattern different from those of FIGS. 12 and 17.

The patterns of the first and second conductors 40, 60 may be determined into any suitable configuration. For example, such a pattern as shown in FIG. 12 may be replaced by V-shaped or I-shaped slit pattern 46 or 66 as shown in FIG. 17 or 18.

If the insulating plate 32 is made of ceramics, it may be formed by calcining a green sheet. More particularly, green sheets are first prepared in the form of an uncalcined flexible thin plate containing a dielectric material, a sintering aiding agent, a binder and so on. The green sheets are then printed with conductive patterns as shown in FIG. 12 and formed with through-holes at necessary locations. These green sheets are sequentially stacked one above another in the procedure of FIG. 12 and laminated at their outer walls by sheets having no printed internal electrodes for insulation and reinforcing. The laminated sheets are integrally molded under given temperature, humidity and pressure to form a monolithic laminate. The monolithic laminate is cut into green chips. These green chips are calcined at a given temperature. The outer wall of each of the green chips in which terminals are exposed is coated with the conductive material having such a pattern as shown in FIG. 12. After coated, the green chip are baked at a raised temperature. Thus, laminate type LC elements of this embodiment can be formed by the use of a known process of making laminated ceramic chip capacitors.

Third Embodiment

The third embodiment of a laminate type LC element constructed in accordance with the present invention is characterized by that it utilizes thin or thick insulating membranes. This enables the laminate type LC element to be formed by the use of a membrane forming technique.

First Concrete Form

FIGS. 19 and 20 show a process of making a laminate type LC element by the use of a membrane forming technique.

Figure 19A:
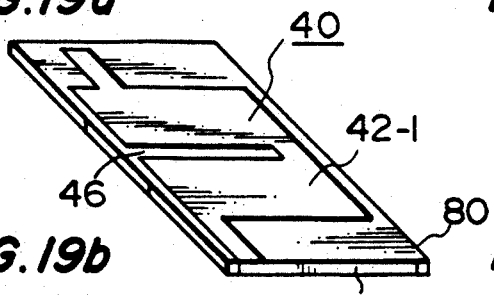

As shown in FIG. 19(a), an auxiliary lead portion 44a is coated and formed on an insulation substrate 80 from the bottom face to the side face thereof. The top face of the substrate 80 is coated with a first sheet-like conductive element 32-1 which has an I-shaped slit pattern 46. The first conductive element 42-1 extends to the auxiliary lead portion 44a.

Figure 19B:

As shown in FIG. 19(b), the top face of the insulation substrate 80 is then coated with a thin insulating membrane 200-1 with the end of the first conductive element 42-1 being partially exposed externally.

Figure 19C:
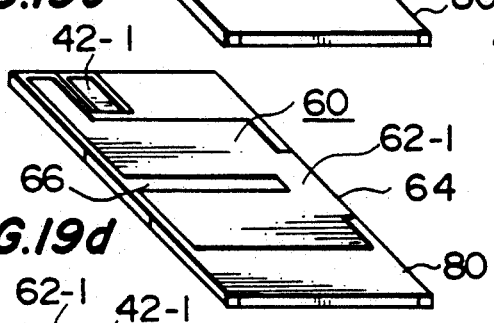

As shown in FIG. 19(c), an auxiliary lead portion 64 is formed on the insulation substrate 80 from the bottom face to the side face thereof. A second sheet-like conductive element 62-1 is then formed on the thin insulating membrane 200-1 in the face-to-face relationship relative to the first conductive element 42-1 through the thin insulating membrane 200-1. The second conductive element 62-1 extends to the auxiliary lead portion 64. The second conductive element 62-1 is also formed with an I-shaped slit pattern 66 opposite to the slit pattern 46.

As shown in FIG. 19(d), a thin insulating membrane 200-2 is then formed over the second conductive element 62-1 except the ends of the conductive elements 42-1 and 62-1.

As shown in FIG. 19(e), a first sheet-like conductive element 42-2 is formed over the thin insulating membrane 200-2 such that the first conductive element 42-2 is electrically connected to the exposed end of the first conductive element 42-1. The first conductive element 42-2 is also formed with an I-shaped slit pattern 46 oriented in the direction opposite to that of the first conductive element 42-1. Thus, the first conductive elements 42-1 and 42-2 will form an energizing path which continuously winds and extends from one gap between the adjacent layers to another.

Figure 19G:
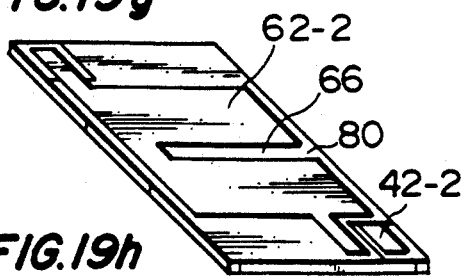
Figure 19H:
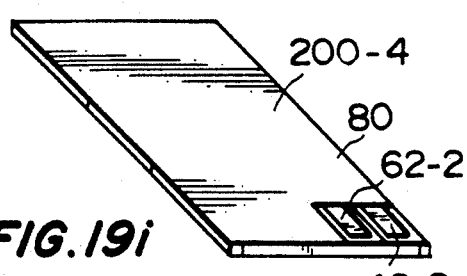
Figure 19I:
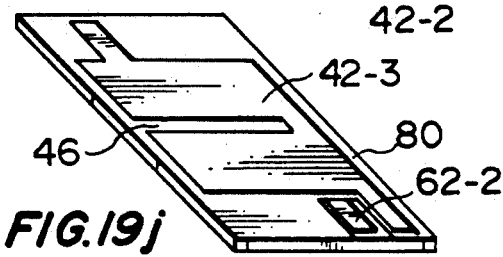

As shown in FIG. 19(f), a thin insulating membrane 200-3 is then formed over the first conductive element 42-2 with the ends of the first and second conductive elements 42-2, 62-1 being exposed externally. As shown in FIG. 19(g), a second sheet-like conductive element 62-2 is then formed over the thin insulating membrane 200-3 and disposed in the face-to-face relationship relative to the first conductive element 42-2.

The membrane and element forming steps are repeated to form a laminate 100, as shown in FIGS. 19(h)–(l) and FIGS. 20(m)–(t).

Figure 20M:
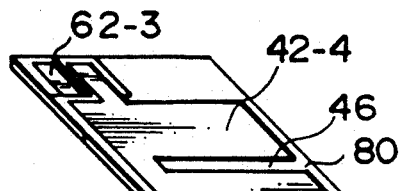
FIGS. 20(m) to (u) illustrate the process of making a laminate type LC element by coating a substrate with materials of conductive element and insulator layer by the use of another film forming technique.
Figure 20N:
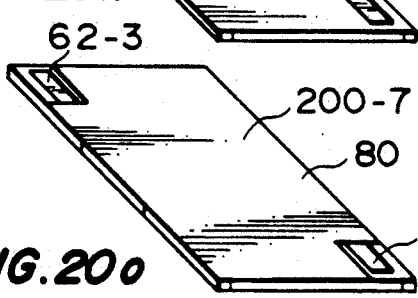
Figure 20O:
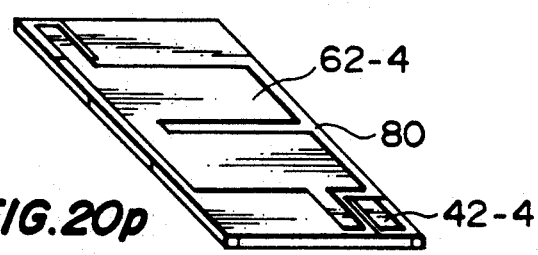
Figure 20P:
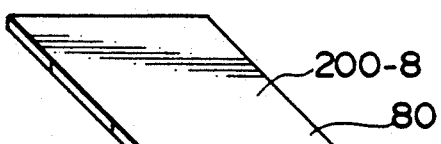
Figure 20Q:
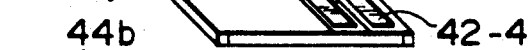
Figure 20R:
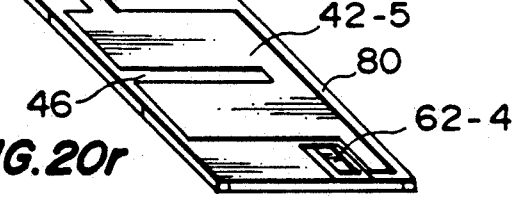
Figure 20S:
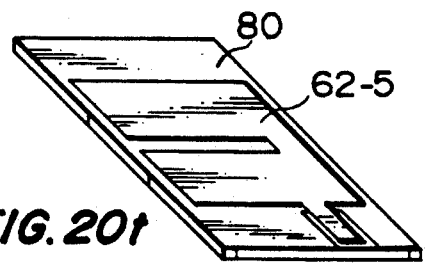
Figure 20T:
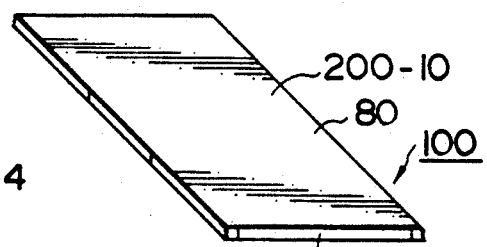

In a step shown in FIG. 20(q), an auxiliary lead portion 44b is formed on the substrate 80 from the side face to the top face thereof and continuous to a first conductive element 42-5.

Figure 20U:
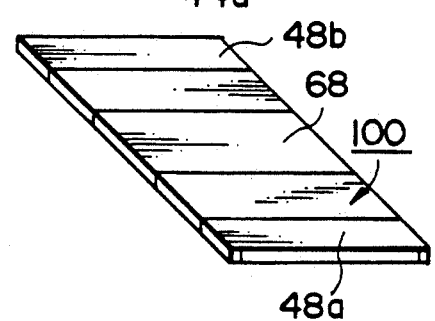
Figure 21:
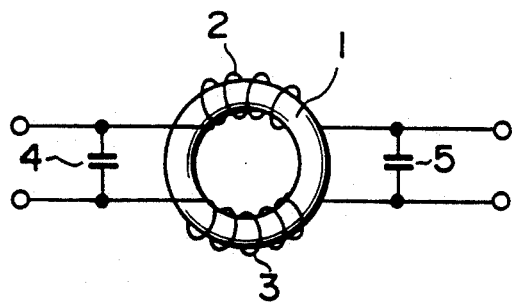
FIG. 21 illustrates a general LC noise filter constructed in accordance with the prior art.

In the final step shown in FIG. 20(u), terminals 48a and 48b and 68 are formed on the top of the laminate 100 and electrically connected to the auxiliary lead portions 44a, 44b and 64.

In such a manner, the present invention provides a three-terminal distributed-constant type LC element having L and C as shown in FIG. 3(A). When such an LC element is used as a noise filter, it can have an improved attenuation through a widened band range.

Although this embodiment has been described as to only one grounding terminal 68 on the end of the second conductor 60, the present invention is not limited to such an arrangement and may be applied to a four-terminal type LC element which comprises terminals 68a and 68b on the opposite ends of the second conductor 60, as shown in FIG. 3(B). In this case, the terminals of the respective first and second conductors 40, 60 may be used as input/output terminals. This provides a common mode type LC noise filter having a distributed constant type capacitance between the adjacent conductors.

The patterns of the first and second conductors 40, 60 may be selected from various suitable patterns.

The laminate type LC element may be easily formed by the use of any one of various membrane forming techniques, such as depositing, sputtering, ion plating, air-phase growing and the like.

When the laminate type LC element is to be formed by the sputtering process, a plurality of vacuum chambers partitioned by gates are first provided. Each of the vacuum chambers is filled with argon. Each of the vacuum chambers receives a target formed of a base material corresponding to the material from which the conductive elements 42 and 62, insulating membrane 200 are made. The target is positioned opposite to a substrate 80 placed within the same vacuum chamber. A mask for specifying a desired pattern is located between the target and the substrate 80.

A negative DC voltage is applied to the target through a minus electrode while the substrate 80 is connected to a grounding electrode. As a high-frequency voltage is applied between the minus electrode and the grounding electrode, the target is subjected to impact of gaseous positive ions to discharge its atoms or molecules which are in turn sputtered toward and deposited on the substrate 80 to form a thin membrane. The sputter pattern is determined depending on the pattern on the mask.

By providing element forming chambers for coating and forming the conductive elements 42 and 62 in addition to the vacuum chambers for forming thin insulating membranes 200 on the substrates 80, the membrane and element forming steps may be alternately and repeatedly carried out to form laminate type LC elements in accordance with the embodiment.

It is to be understood that the laminate type LC elements formed by such a membrane forming technique are smaller and lighter than those of the first and second embodiment.

Other Concrete Forms

In the second and third embodiments, the second conductor 60 functioning as a grounding conductor may be divided into a plurality of grounding conductor sections which are grounded between the adjacent sections, as in the third concrete form of the first embodiment.

The LC noise filter of the second and third embodiments may be formed to have the first and third conductors 40, 70 functioning as energizing conductors and the second conductor 60 functioning as the grounding conductor, if necessary, as shown in FIG. 11.

Although the first and second embodiments have been described as to the first and second conductors 40, 60 which are formed on the insulating plate 32 and substrate 80 or on the thin insulating membrane 200, the present invention is not limited to such arrangements and may be applied to such an arrangement that conductive sheets are stamped into the shapes of the first and second conductive elements 42, 62, these stamped conductive sheets being then secured to the insulating plates 32, substrates 80 and thin insulating membranes 200 which have been previously sintered.

There will now be described briefly a process of forming insulating sheets 32 of barium titanate(BaTiO$_3$) as the insulating sheets and attaching copper sheets to the insulating sheets 32, the copper sheets being stamped to define conductive elements.

In this process, thin square-shaped sheets of barium titanate are first calcined in air at a temperature ranged between 1250 degrees C. and 1350 degrees C. for about two hours to form insulating sheets 30.

The insulating sheets 32 are then stacked with copper sheets stamped into a predetermined conductive pattern to form a laminate, as shown in FIG. 12. This laminate is then calcined in an neutral atmosphere (or reducing atmosphere) at a temperature lower than the melting point of copper and also lower than 1100 degrees C.

The neutral atmosphere is preferably an atmosphere in which oxygen of 2-100 ppm is doped into nitrogen. The setting of the above temperature lower than 1100 degrees C. is because if barium titanate is calcined at a temperature higher than 1100 degrees C., it becomes a semiconductor under such a reaction. In this embodiment, the laminate is calcined at a temperature ranged between 950 degrees C. and 1000 degrees C. for a given time.

Then a compound for example pyrochlore or the like is formed between insulator sheets 32 formed of barium titanate and the copper sheet, whereby the copper sheet is properly adhered to insulator sheets 32.

The reaction is more improved as the amount of doped oxygen is increased in the neutral atmosphere. However, if the amount of doped oxygen is too large, the surface of copper functioning a terminal will be oxidized, leading to difficulty in soldering. It is therefore preferred that the LC element calcined in the neutral atmosphere containing the increased amount of doped oxygen is again calcined in a given reducing atmosphere.

In such a manner, laminate type LC elements may be well formed even if the insulating sheets 32 is made of barium titanate and the copper sheets are stamped to provide the conductive elements 42 and 62.

The barium titanate sheet may be replaced by a thermoplastic sheet. It is however believed that the thermoplastic material is more variable in passage of time and inferior to the barium titanate in durability.

Although the third embodiment has been described as to the thin insulating membranes 200 formed by the use of the membrane forming technique, the present invention is not limited to such a technique and may be carried out on any other technique, for example, by the use of insulating sheets.

In the aforementioned embodiments, the inductance in the first and second conductors 40, 60 may be increased as by forming the respective conductive elements 42 and 62 of any suitable electromagnetic material such as Fe of the like or as by applying powdered or liquid magnetic material onto the conductive elements 42 and 62. Furthermore, the inductance L may be increased by mixing a magnetic material in the material of insulating plates 32 and thin insulating membrane 200.

Further, a open or closed magnetic path extending around the laminate 100 through a central bore receiving a magnetic core in the laminate 100 may be formed by powder painting the external surface of the laminate 100 with a magnetic material or housing it within a magnetic container.

If required, the inductance L may be increased by providing the first and second conductors 40, 60 having different lengths, for example, such that the length of the first conductor 40 is larger than that of the second conductor 60.

The capacitance may be increased as by decreasing the thickness of each of the insulating sheets or as by taking an electrolytic condenser process to form each conductor into a porous structure.

Although the embodiments have been described as to the insulating plates 32 and thin insulating membranes 200 which are made of a dielectric material such as ceramics or plastic, the LC noise filter of the present invention may be improved in performance through the high-frequency band range if it is made of a material capable of absorbing electromagnetic waves and generating heat.

Although the embodiments have been described as to the laminate type LC element which is particularly usable in a noise filter, the present invention may be applied to various other filters and surge absorbing varister.

Although the third embodiment has been described as to the membrane forming technique, the LC elements of the present invention may be formed by the use of a thick membrane forming technique, if required.

We claim:

1. A laminate type LC element comprising:
    a plurality of first insulating layers forming a laminate by stacking adjacent first insulating layers one above another;
    a first conductor including a plurality of first sheet-like conductive elements electrically connected to one another, said first conductor continuously winding and extending between the adjacent first insulating layers of said plurality of insulating layers, each of said plurality of first sheet-like conductive elements including a slit formed therein to form an energizing path along said first conductor continuously winding and extending between the adjacent insulating layers, said first conductor functioning as a coil having a preselected number of turns; and a second conductor including a plurality of second sheet-like conductive elements, said second conductor located between said plurality of first insulating layers and arranged such that each of said plurality of second sheet like conductive elements is in a face-to-face relationship to a corresponding one of said plurality of first sheet-like conductive elements through a corresponding one of said plurality of said first insulating layers to form a capacitance between said first and second conductors.

2. The laminate type LC element of claim 1, wherein said plurality of second sheet-like conductive elements are serially electrically connected to one another and are disposed to wind and extend between the adjacent insulating layers.

3. The laminate type LC element of claim 2, wherein each of said plurality of second sheet-like conductive elements includes a slit formed therein for forming an energizing path, said slit having a configuration corresponding to said plurality of first sheet-like conductive elements disposed in the face-to-face relationship relative to said plurality of second sheet-like conductive elements.

4. The laminate type LC element of claim 1, wherein said second conductor is formed into a grounded capacitor conductor and wherein said first conductor is formed into an inductor conductor including input/output terminals formed therein whereby said laminate type LC element can be used as a normal mode type LC noise filter.

5. The laminate type LC element of claim 3, wherein said second conductor is formed into a grounded capacitor conductor and wherein said first conductor is formed into an inductor conductor including input/output terminals formed therein whereby said laminate type LC element can be used as a normal mode type LC noise filter.

6. The laminate type LC element of claim 1, wherein said first and second conductors are formed into inductor conductors, each of said first and second conductors including input/output terminals formed therein whereby said laminate type LC element can be used as a common mode type LC noise filter.

7. The laminate type LC element of claim 3, wherein said first and second conductors are formed into inductor conductors, each of said first and second conductors including input/output terminals formed therein whereby said laminate type LC element can be used as a common mode type LC noise filter.

8. The laminate type LC element of claim 3, further comprising:

a plurality of second insulating layers, each of said plurality of second insulating layers formed on a surface of a corresponding one of said plurality of second sheet-like conductive elements and opposite of said plurality of first insulating layers; and a third conductor including a plurality of third sheet-like conductive elements electrically connected to one another, said third conductor continuously winding and extending between adjacent insulating layers of said plurality of second insulating layers, each of said plurality of third sheet-like conductive elements being arranged in a face-to-face relationship to a corresponding one of said plurality of second sheet-like conductive elements, each of said plurality of third sheet-like conductive elements including a slit formed therein to form an energizing path continuously winding and extending between the adjacent insulating layers of said plurality of second insulating layers, said third conductor functioning as a coil having a preselected number of turns, and said second conductor being formed into a grounded capacitor conductor and said first and third conductors being formed into inductor conductors including input/output terminals formed therein whereby said laminate type LC element can be used as an LC noise filter.

9. The laminate type LC element of claim 1, wherein said plurality of first insulating layers comprises a plurality of oppositely folded and stacked first insulating sheet sections to form the laminate, said plurality of first sheet-like conductive elements being adapted to form a coil having a preselected number of turns and one of said plurality of first sheet-like conductive elements provided on one side of each of said first insulating sheet sections, and one of said plurality of second sheet-like conductive elements being provided on another side of each of said first insulating sheet sections substantially in the face-to-face relationship relative to the corresponding one of said first sheet-like conductive elements.

10. The laminate type LC element claim 3, wherein said plurality of first insulating layers comprises a plurality of oppositely folded and stacked first insulating sheet sections, said plurality of first sheet-like conductive elements being adapted to form a coil having a preselected number of turns and one of said plurality of first sheet-like conductive elements provided on one side of each of said first insulating sheet sections, and each of said plurality of second sheet-like conductive elements being arranged on another side of each of said first insulating sheet sections substantially in the face-to-face relationship relative to the corresponding one of said plurality of first sheet-like conductive elements.

11. The laminate type LC element of claim 9, wherein said plurality of oppositely folded and stacked first insulating sheet sections are serially connected to one another to form a single continuous sheet.

12. The laminate type LC element of claim 1, wherein said plurality of first insulating layers is a plurality of physically separated first insulating sheet sections, said separate first insulating sheet sections being stacked together between said first and second conductors on the opposite sides of said physically separated first insulating sheet sections.

13. The laminate type LC element of claim 1, wherein said plurality of insulating layers is a plurality of stacked insulating plates, each of said plurality of stacked insulating plates provided between corresponding ones of said first and second sheet-like conductive elements.

14. The laminate type LC element of claim 1, wherein said plurality of first insulating layers is a plurality of stacked insulating membranes, said plurality of first and second sheet-like conductive elements having externally exposed parts, and said plurality of first and second sheet-like conductive elements alternatingly inserted between adjacent ones of said plurality of stacked insulating membranes and being connected through said externally exposed parts.

15. The laminate type LC element of claim 3, wherein said plurality of first insulating layers is a plurality of stacked insulating membranes, said plurality of first and second sheet-like conductive elements having externally exposed parts, and said plurality of first and second sheet-like conductive elements alternatingly inserted between adjacent ones of said plurality of insulating membranes and being connected through said externally exposed parts.

16. The laminate type LC element of claim 8, wherein said laminate includes a plurality of stacked insulating membranes with parts of said conductive elements being exposed externally and wherein said first and second conductive elements between a pair of adjacent insulating layers are respectively connected to the first and second conductive elements between another adjacent pair of adjacent insulating layers through said exposed conductive element parts.

17. The laminate type LC element of claim 5, wherein in a grounding terminal of said second conductor is disposed at a position electrically nearer either of said input/output terminals on the opposite ends of said first conductor.

18. The laminate type LC element of claim 5, wherein said second conductor is divided into a plurality of grounded conductor sections.

19. A laminate type LC element comprising:
a first insulating layer having predetermined folding lines and having first and second surfaces;
a first conductor having a plurality of serially connected first conductive portions formed on said first surface of said first insulating layer, each of said plurality of first conductive portions having a slit of a predetermined shape formed therein to form a continuous electrical path along the first conductor and;
a second conductor having a plurality of second conductive portions formed on said second surface of said first insulating layer, each of said plurality of second conductive portions arranged in a face-to-face relationship to a corresponding one of said plurality of first conductive portions to form a capacitance between each said first and second conductive portions, wherein said first conductor, said second conductor and said first insulating layer are oppositely folded and stacked along said folding lines to form the laminated type LC element, said first conductor forming a coil having a preselected number of turns.

20. The laminate type LC element of claim 19, wherein said second conductor is a grounded capacitor conductor and wherein said first conductor is an inductor conductor including input/output terminals formed therein such that the laminate type LC element is a normal mode type LC noise filter.

21. The laminate type LC element of claim 19, wherein said plurality of second conductive portions are serially connected and each of said plurality of second conductive portions includes a slit formed therein for forming a continuous electrical path, each said second conductive portion having a configuration corresponding to said corresponding one of said plurality of first conductive portions.

22. The laminate type LC of claim 21, wherein said second conductor is a grounded capacitor conductor and wherein said first conductor is an inductor conductor including input/output terminals formed therein the laminate type LC element is a normal mode type LC noise filter.

23. The laminate type LC element of claim 22, further comprising a grounding terminal of said second conductor disposed at a position electrically near either of said input/output terminals on the opposite ends of said first conductor.

24. The laminate type LC element of claim 22, wherein said second conductor is divided into a plurality of serially connected grounded conductor sections.

25. The laminate type LC element of claim 21, further comprising:
a second insulating layer having predetermined folding lines corresponding to said folding lines of said first insulating layer and having first and second surfaces, said second insulating layer formed on said second conductor and on a surface opposite of said first insulating layer; and
a third conductor having a plurality of serially connected third conductive portions formed on said second insulating layer and on a surface opposite of said first insulating layer, each of said plurality of third conductive portions having a slit formed therein to form a continuous electrical path along said third conductor, wherein said third conductor and second insulating layer are oppositely folded and stacked with said first conductor, second conductor and first insulating layer along the folding lines of said first and second insulating layers to form the laminate type LC element, said third conductor forming a coil having a preselected number of turns.

26. The laminate type LC element of claim 25, wherein said second conductor is a grounded capacitor conductor and said first and third conductors are inductor conductors including input/output terminals formed therein whereby the laminate type LC element is an LC noise filter.

27. The laminate type LC element of claim 19, wherein said first and second conductors are inductor conductors, each of said first and second conductors including input/output terminals formed therein such that the laminate type LC element is a common mode type LC noise filter.

28. The laminate type LC element of claim 21, wherein said first and second conductors are inductor conductors, each of said first and second conductors including input/output terminals formed therein such that said laminate type LC element is a common type LC noise filter.

* * * * *